(12) United States Patent
Yamashita

(10) Patent No.: US 10,443,776 B2
(45) Date of Patent: Oct. 15, 2019

(54) DECOMPRESSION HEAT-INSULATING PIPE STRUCTURE

(71) Applicant: TOYOTA JIDOSHA KABUSHIKI KAISHA, Toyota-shi (JP)

(72) Inventor: Osamu Yamashita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 73 days.

(21) Appl. No.: 15/878,712

(22) Filed: Jan. 24, 2018

(65) Prior Publication Data
US 2018/0231170 A1    Aug. 16, 2018

(30) Foreign Application Priority Data

Feb. 15, 2017  (JP) ................. 2017-025898

(51) Int. Cl.
*F16L 59/065*     (2006.01)
*B01J 10/00*      (2006.01)
(Continued)

(52) U.S. Cl.
CPC .......... *F16L 59/065* (2013.01); *B01J 10/005* (2013.01); *B01J 12/005* (2013.01); *C21D 9/0006* (2013.01); *F16J 15/061* (2013.01); *F16L 9/18* (2013.01); *F16L 27/11* (2013.01); *F16L 27/12* (2013.01); *F16L 51/025* (2013.01); *F16L 59/143* (2013.01); *F27D 3/0025* (2013.01); *F27D 3/0033* (2013.01); *F27D 3/18* (2013.01);
(Continued)

(58) Field of Classification Search
CPC . F16L 59/065; F16L 9/18; F16L 27/11; F16L 27/12; F16L 51/025; F16L 59/143; B01J 10/005; B01J 12/005; B01J 19/0073; C21D 9/0006; F16J 15/061; F27D 3/0025; F27D 3/0033; F27D 3/18; F27D 99/0073
USPC ........................................ 138/148
See application file for complete search history.

(56) References Cited

U.S. PATENT DOCUMENTS 3,964,754 A * 6/1976 Murai ................. F16L 7/02
277/621
4,029,344 A * 6/1977 Stone ................. E04F 17/02
138/148

(Continued)

FOREIGN PATENT DOCUMENTS

EP    2 388 503 A1   11/2011
FR       558713 A     9/1923
(Continued)

*Primary Examiner* — Craig M Schneider
*Assistant Examiner* — David R Deal
(74) *Attorney, Agent, or Firm* — Oblon, McClelland, Maier & Neustadt, L.L.P.

(57) ABSTRACT

Provided is a decompression heat-insulating pipe structure that can be used in the system operating at high temperatures. A decompression heat-insulating pipe structure of the present disclosure includes: an outer tube and an inner tube each having a flange; and a seal member between the flanges, the seal member being configured to keep a space between the outer tube and the inner tube in a decompression state, and a shifting means configured to shift the outer tube and the inner tube relatively so as to selectively dispose the tubes at a pressing position to press the seal member between the flanges and at a cancellation position to cancel the pressing of the seal member.

4 Claims, 7 Drawing Sheets

(51) Int. Cl.
  *B01J 12/00* (2006.01)
  *C21D 9/00* (2006.01)
  *F16L 59/14* (2006.01)
  *F16J 15/06* (2006.01)
  *F16L 9/18* (2006.01)
  *F16L 27/11* (2006.01)
  *F16L 27/12* (2006.01)
  *F16L 51/02* (2006.01)
  *F27D 3/00* (2006.01)
  *F27D 3/18* (2006.01)
  *F27D 99/00* (2010.01)
  *B01J 19/00* (2006.01)

(52) U.S. Cl.
  CPC ....... *F27D 99/0073* (2013.01); *B01J 19/0073* (2013.01); *F16L 51/02* (2013.01)

(56) References Cited

U.S. PATENT DOCUMENTS

| | | | | |
|---|---|---|---|---|
| 4,475,341 A * | 10/1984 | Inoue | ...... | F01N 13/10 138/148 |
| 4,534,923 A * | 8/1985 | Lupke | ...... | B26F 1/0069 264/156 |
| 5,224,857 A | 7/1993 | Schultz et al. | | |
| 6,354,632 B1 * | 3/2002 | Jung | ...... | F01N 13/1811 285/49 |
| 6,419,280 B2 * | 7/2002 | Uegane | ...... | F01N 13/1816 285/299 |
| 6,910,506 B2 * | 6/2005 | Gabriel | ...... | F01N 13/08 138/109 |
| 2005/0011573 A1 * | 1/2005 | Chahine | ...... | F01N 13/1816 138/148 |
| 2006/0067860 A1 * | 3/2006 | Faircloth, Jr. | ...... | F01N 3/0211 422/171 |
| 2008/0169037 A1 * | 7/2008 | Ziegler | ...... | F16L 39/005 138/149 |
| 2009/0284006 A1 * | 11/2009 | Chahine | ...... | F01N 13/1811 285/229 |
| 2011/0233923 A1 * | 9/2011 | Kouketsu | ...... | F16L 39/005 285/123.3 |
| 2014/0339815 A1 * | 11/2014 | Johnson | ...... | F16L 51/00 285/226 |
| 2018/0141740 A1 | 5/2018 | Yamashita | | |
| 2018/0178967 A1 | 6/2018 | Yamashita | | |
| 2018/0224053 A1 | 8/2018 | Yamashita | | |

FOREIGN PATENT DOCUMENTS

| | | |
|---|---|---|
| JP | 2003-314785 | 11/2003 |
| JP | 2011-219125 | 11/2011 |

\* cited by examiner

US 10,443,776 B2

DECOMPRESSION HEAT-INSULATING PIPE STRUCTURE

CROSS REFERENCE TO RELATED APPLICATIONS

The present application claims priority from Japanese patent application JP 2017-025898 filed on Feb. 15, 2017, the content of which is hereby incorporated by reference into this application.

BACKGROUND

Technical Field

The present disclosure relates to a decompression heat-insulating pipe structure including a seal member between flanges of an outer tube and an inner tube, the seal member being configured to keep the space between the outer tube and the inner tube in a decompression state.

Background Art

JP 2011-219125 A discloses the structure of a vacuum heat-insulating vessel having a vacuum space between an outer tube and an inner tube. The outer tube and the inner tube of this vacuum heat-insulating vessel are joined by welding, for example, and so the vacuum insulating vessel has an integrated structure.

SUMMARY

When the structure of JP 2011-219125 A is used in the system so that the internal space of the inner tube is connected to a heating oven and is subjected to high temperature, the following problem may occur. That is, the inner tube is expanded in diameter because of thermal expansion by heating, whereas the temperature of the outer tube does not rise because of heat insulation. Then a dimensional difference is generated between the inner tube and the outer tube, and so large distortion stress acts on the joining part by welding between the inner tube and the outer tube, and the welded part may be disjoined. Therefore it is difficult to use the structure of the vacuum heat-insulating vessel of JP 2011-219125 A in the system operating at high temperatures.

At a temperature range from 250° C. to 300° C., for example, the above dimensional difference may be absorbed by an elastic seal member, such as silicone rubber (heat resistance: 250° C.) and fluorine-containing rubber (heat resistance: 300° C.). The temperature that such an elastic seal member can be resistant to is low, and so these seal members cannot be used at this temperature range or higher. On the contrary, seal members resistant to a higher temperature have low elasticity, and so cannot absorb the above dimensional difference with the elastic deformation.

In view of the above, the present disclosure provides a decompression heat-insulating pipe structure that can be used in the system operating at high temperatures.

To solve the above problem, a decompression heat-insulating pipe structure of the present disclosure includes: an outer tube and an inner tube each having a flange; and a seal member between the flanges, the seal member being configured to keep a space between the outer tube and the inner tube in a decompression state. The decompression heat-insulating pipe structure further includes: a shifting means configured to shift the outer tube and the inner tube relatively so as to selectively dispose the tubes at a sandwiching position to sandwich the seal member between the flanges and at a cancellation position to cancel sandwiching of the seal member.

According to the present disclosure, the inner tube is thermally expanded at the cancellation position, for example, and the tubes are relatively shifted at the sandwiching position while keeping the thermal expansion of the inner tube, and then the space between the outer tube and the inner tube at the sandwiching position can be decompressed. With this configuration, the inner tube is thermally expanded, followed by sandwiching of the seal member with the tubes. Thereby, distortion due to thermal expansion can be suppressed between the outer tube and the inner tube. Therefore, a seal member with low elasticity and high heat resistance can be used, whereby thermal degradation of the seal member can be suppressed, and the structure including such a seal member can be used in the system operating at high temperatures.

Preferably, the decompression heat-insulating pipe structure of the present disclosure includes a control means that controls the shifting means. The control means controls the shifting means to, when an amount of temperature rise of the inner tube at the sandwiching position reaches a predetermined value, move the outer tube or the inner tube to dispose the outer tube or the inner tube from the sandwiching position to the cancellation position and then dispose the outer tube or the inner tube from the cancellation position to the sandwiching position again.

According to the present disclosure, such motion of the shifting means can remove the distortion stored due to the temperature rise at the sandwiching position. This can prevent an increase of the distortion beyond the permissible value.

Preferably, in the decompression heat-insulating pipe structure of the present disclosure, the outer tube has a first flange extending radially inward from an axially one end thereof, and a second flange extending radially outward from the axially other end thereof, the inner tube has a third flange extending radially inward from an axially one end thereof, and a fourth flange extending radially outward from the axially other end thereof, the third flange being opposed to the first flange at an axially inward position of the first flange, and the fourth flange being opposed to the second flange at an axially outward position of the second flange, and the seal member includes a first seal member between the first flange and the third flange, and a second seal member between the second flange and the fourth flange.

According to the present disclosure, when the space between the outer tube and the inner tube is decompressed, the atmospheric pressure can bias the outer tube and the inner tube so that the distance between the first flange and the third flange and the distance between the second flange and the fourth flange are narrowed. As a result, the first seal member can be compressed between the first flange and the third flange, and the second seal member can be compressed between the second flange and the fourth flange, from which a self-sealing property can be obtained. In this way, the space can be decompressed reliably, and so high heat insulation performance can be obtained. The structure can be easily assembled simply by inserting the inner tube into the outer tube.

Preferably, in the decompression heat-insulating pipe structure of the present disclosure, at least one of the outer tube and the inner tube includes a bellows that can elongate or contract axially due to elastic deformation.

According to the present disclosure, when the inner tube elongates axially due to the thermal expansion, the bellows is deformed elastically to elongate or contract and so absorbs a dimensional difference with the outer tube. In this way, sealing with the first seal member and with the second seal member can be kept.

The present disclosure can provide a decompression heat-insulating pipe structure that can be used in the system operating at high temperatures.

DETAILED DESCRIPTION

First Embodiment

The following describes a first embodiment of the present disclosure in details, with reference to the drawings.

Figure 1A:
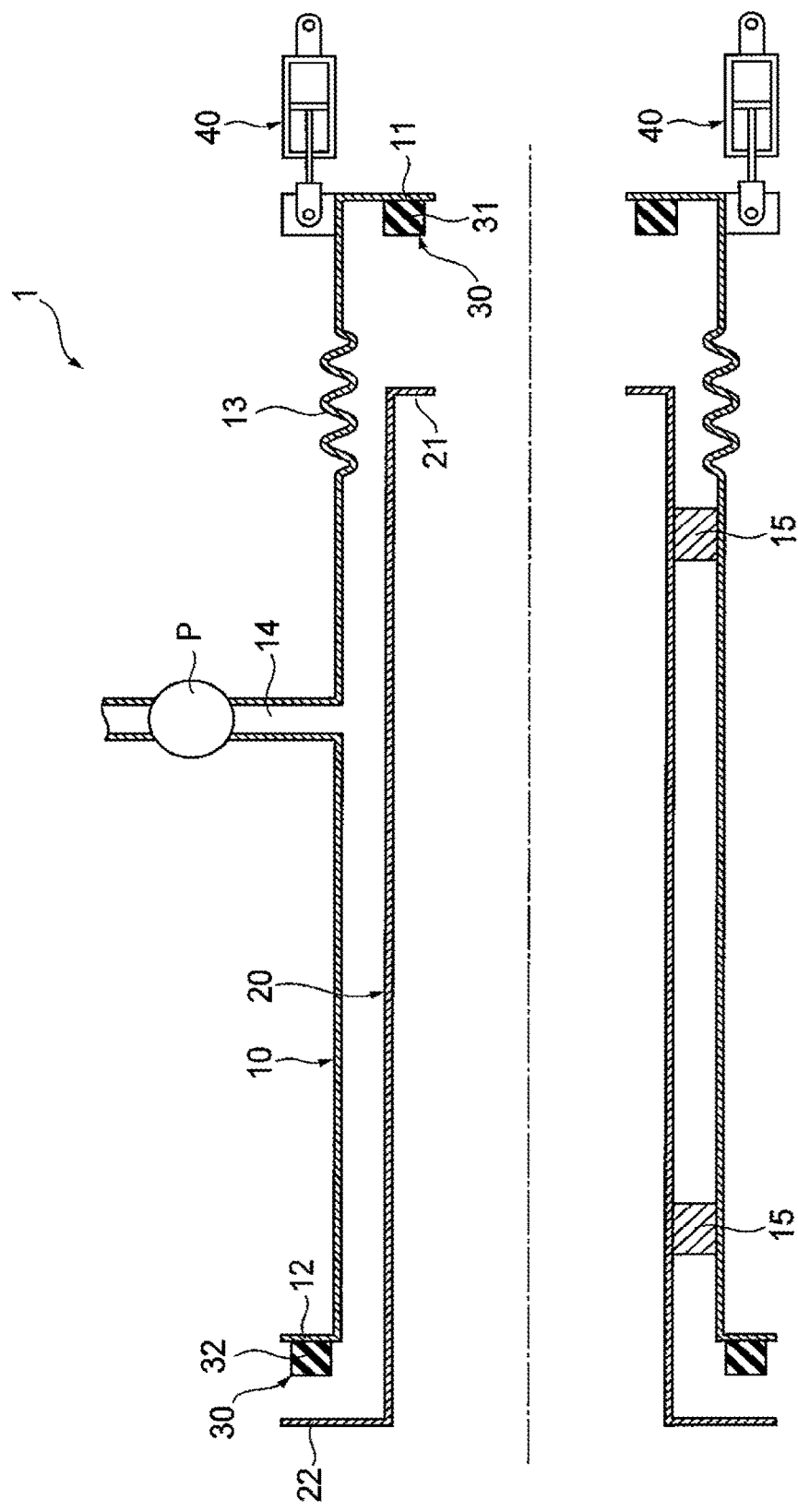
FIG. 1A schematically shows a heat-treating furnace in cross section, having a heat-insulating wall structure according to the first embodiment, and shows the inner tube before thermal expansion.
Figure 1B:
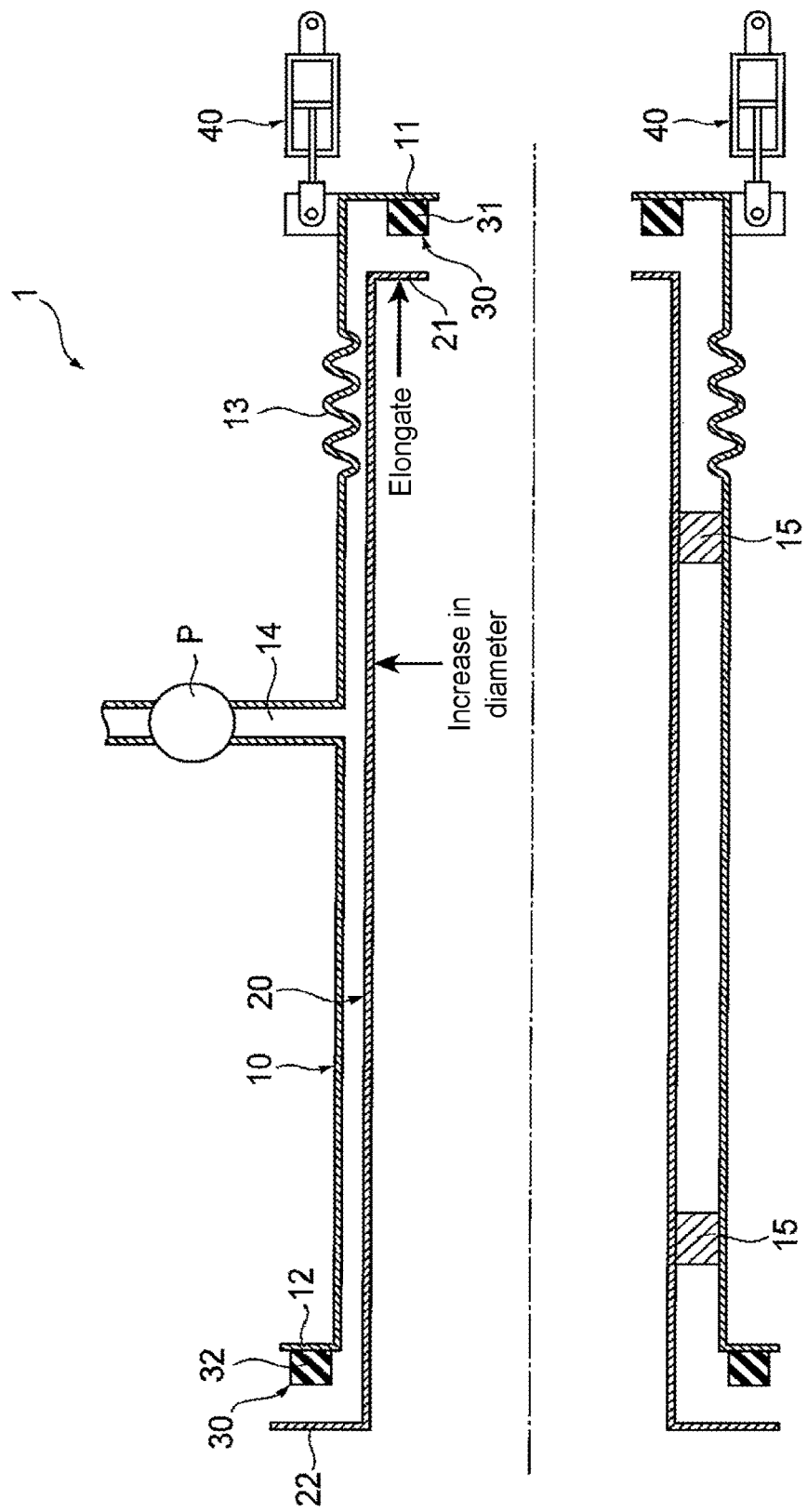
FIG. 1B schematically shows a heat-treating furnace in cross section, having a heat-insulating wall structure according to the first embodiment, and shows the inner tube that is thermally expanded.
Figure 1C:
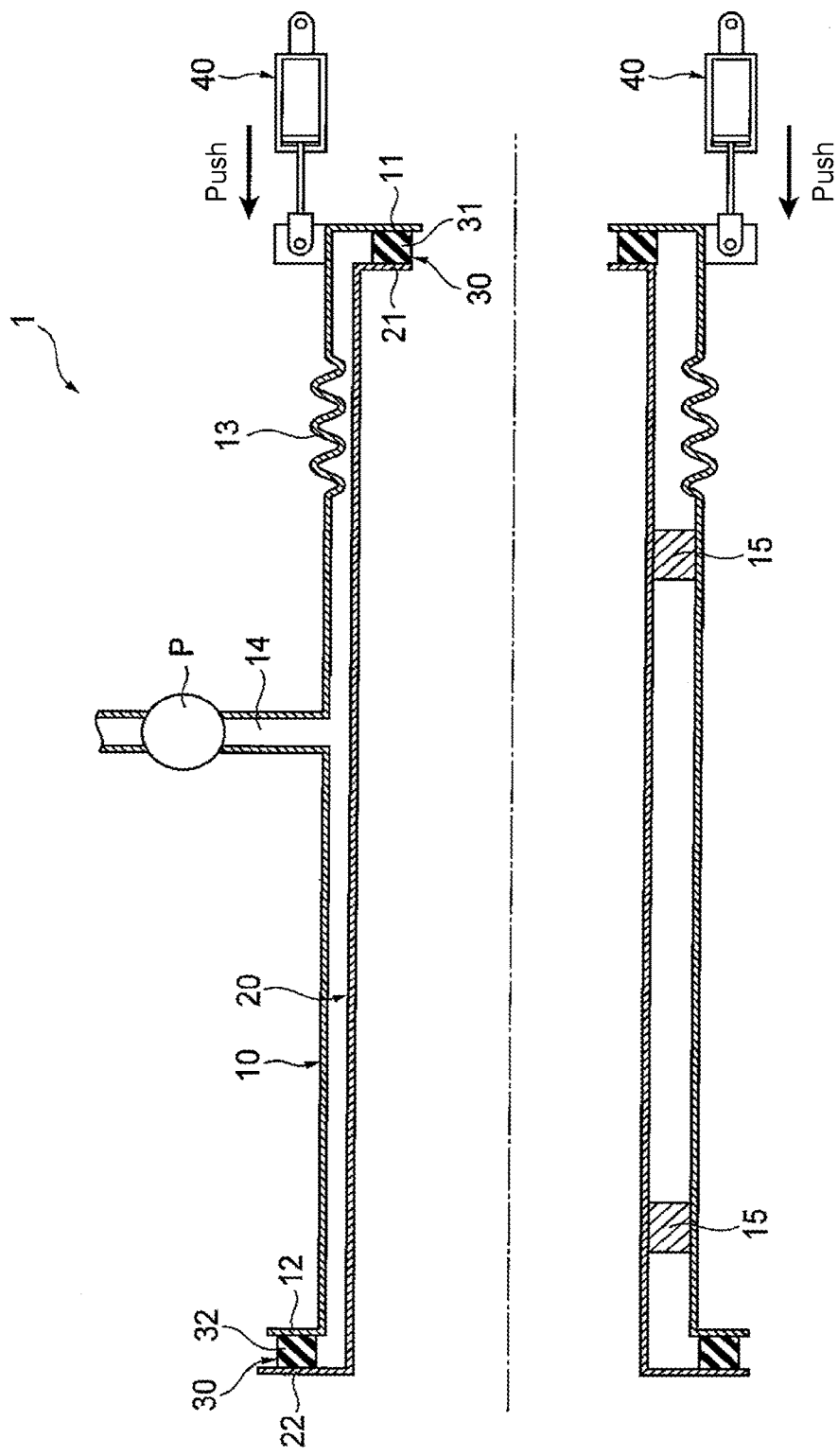
FIG. 1C schematically shows a heat-treating furnace in cross section, having a heat-insulating wall structure according to the first embodiment, and shows the decompressed space between the inner tube and the outer tube.

FIG. 1 schematically shows a heat-treating furnace in cross section, having a heat-insulating wall structure according to the first embodiment. FIG. 1A is a cross-sectional view showing the inner tube before thermal expansion, FIG. 1B is a cross-sectional view showing the inner tube that is thermally expanded, and FIG. 1C is a cross-sectional view of the decompressed space between the inner tube and the outer tube.

The heat-treating furnace 1 has a decompression heat-insulating pipe structure according to the present embodiment, and has a double-tube structure including an outer tube 10 and an inner tube 20 inserted into the outer tube 10.

The outer tube 10 and the inner tube 20 each have a cylindrical tubular shape having a constant diameter and extending in the axial direction. The outer tube 10 and the inner tube 20 are disposed on a base not illustrated so that their axial directions are parallel to the base. The outer tube and the inner tube are supported so as to be relatively movable in the axial direction. The outer tube 10 of the present embodiment is supported to reciprocate relative to the inner tube 20 in the axial direction.

The outer tube 10 and the inner tube 20 have flanges opposed to each other at their both ends, and a seal member 30 is disposed between the opposed flanges. The outer tube 10 has a first flange 11 extending radially inward from its axially one end, and a second flange 12 extending radially outward from the axially other end. The inner tube 20 has a third flange 21 extending radially inward from its axially one end, and a fourth flange 22 extending radially outward from the axially other end. The third flange is opposed to the first flange 11 at an axially inward position of the first flange 11. The fourth flange is opposed to the second flange 12 at an axially outward position of the second flange 12.

The seal member 30 has an annular shape, and is sandwiched between the flanges for sealing between the outer tube 10 and the inner tube 20. The seal member has a configuration to keep the space between the outer tube 10 and the inner tube 20 in a decompression state. A first seal member 31 is disposed between the first flange 11 and the third flange 21, and a second seal member 32 is disposed between the second flange 12 and the fourth flange 22. The seal member 30 is preferably disposed at the outer tube 10 that expands less thermally. In the present embodiment, the first seal member 31 is fixed to the first flange 11, and the second seal member 32 is fixed to the second flange 12.

The first seal member 31 and the second seal member 32 are made of a material with less elasticity and high heat resistance, such as graphite and vermiculite (heat resistant temperature: 1000° C.), for example. For the first seal member 31 and the second seal member 32, Thermiculite #815 produced by Flexitallic Ltd can be used, for example.

The first seal member 31 is disposed between the first flange 11 and the third flange 21 so as to be sandwiched from axially both sides for sealing between the first flange 11 and the third flange 21. The second seal member 32 is disposed between the second flange 12 and the fourth flange 22 so as to be sandwiched from axially both sides for sealing between the second flange 12 and the fourth flange 22.

The outer tube 10 includes a shifting means 40. The shifting means shifts the outer tube 10 and the inner tube 20 relatively so as to selectively dispose these tubes at a sandwiching position to sandwich the seal member 30 between the flanges and a cancellation position to cancel the sandwiching. The shifting means 40 has an air cylinder that can elongate and contract due to the compressed air supplied. As the air cylinder elongates, the outer tube 10 moves from an axially one side to the other side, and is disposed at the sandwiching position. As the air cylinder contracts, the outer tube 10 moves from the axially other side to the one side, and is disposed at the cancellation position. The present embodiment describes the case where the outer tube 10 is supported to reciprocate relative to the inner tube 20 in the axial direction, and the shifting means 40 moves the outer tube 10. Instead, the inner tube 20 may be supported to reciprocate relative to the outer tube 10 in the axial direction, and the shifting means 40 may move the inner tube 20.

At the sandwiching position, the first seal member 31 at the first flange 11 is pressed by the third flange 21 so as to be sandwiched from axially both sides between the first flange 11 and the third flange 21 for sealing between the first flange 11 and the third flange 21. At the same time, the second seal member 32 at the second flange 12 is pressed by the fourth flange 22 so as to be sandwiched from axially both sides between the second flange 12 and the fourth flange 22 for sealing between the second flange 12 and the fourth flange 22.

On the contrary, at the cancellation position, the first seal member 31 at the first flange 11 is separated from the third flange 21 so as to define a predetermined gap with the third flange 21 for cancellation of the sealing between the first flange 11 and the third flange 21. At the same time, the second seal member 32 at the second flange 12 is separated from the fourth flange 22 so as to define a predetermined gap with the fourth flange 22 for cancellation of the sealing between the second flange 12 and the fourth flange 22.

The outer tube 10 connects with an exhaust channel 14 leading to a vacuum pump P. At the pressed position, air between the outer tube 10 and the inner tube 20 is exhausted through the exhaust channel 14 so that the space between the outer tube 10 and the inner tube 20 can be decompressed. Such decompressed space between the outer tube 10 and the inner tube 20 leads to heat insulation between the external part of the outer tube 10 and the internal space surrounded with the inner tube 20 of the heat-treating furnace 1.

A supporting base 15 is disposed between the outer tube 10 and the inner tube 20. The supporting base is disposed inside of the outer tube 10 and supports the inner tube 20. The supporting base 15 is disposed between the outer tube 10 and the inner tube 20 to be at the lowermost position. The supporting base 15 is made of a material with low heat conductivity, such as ceramic. The supporting base 15 is to receive the weight of the inner tube 20 itself and the weight of components attached to the internal space of the inner tube 20 for supporting. The supporting base is disposed when the first seal member 31 and the second seal member 32 cannot support the weight of them.

The outer tube 10 includes a bellows 13. The bellows 13 is integrally formed with the outer tube 10. More specifically, the bellows is formed at a position between axially one end and the axially other end of the outer tube 10, and has a large-diameter part and a small-diameter part that are alternately and continuously formed. The bellows 13 is elastically deformed in the direction of increasing and decreasing the distance between the large-diameter part and the small-diameter part, whereby the outer tube 10 can elongate and contract axially.

In the heat-treating furnace 1, the temperature of the internal space of the inner tube 20 (the temperature in the furnace) is kept at high temperatures, such as 600° C. or higher, and the space between the outer tube 10 and the inner tube 20 is decompressed for heat insulation. In such an operating state, a work is conveyed into the internal space of the inner tube 20 and is heated. A not-illustrated heater is disposed in the internal space of the inner tube 20 so as to increase the temperature in the furnace and keep the space at a high temperature.

In the heat-treating furnace 1, the outer tube 10 has the first flange 11 extending radially inward from its axially one end, and the second flange 12 extending radially outward from the axially other end, and the inner tube 20 has the third flange 21 extending radially inward from its axially one end and the fourth flange 22 extending radially outward from the axially other end. The third flange is opposed to the first flange 11 at an axially inward position of the first flange 11. The fourth flange is opposed to the second flange 12 at an axially outward position of the second flange 12. The first seal member 31 is disposed between the first flange 11 and the third flange 21, and the second seal member 32 is disposed between the second flange 12 and the fourth flange 22.

With this configuration, when the space between the outer tube 10 and the inner tube 20 is decompressed, the atmospheric pressure can bias the outer tube 10 and the inner tube 20 so that the distance between the first flange 11 and the third flange 21 and the distance between the second flange 12 and the fourth flange 22 are narrowed. As a result, the first seal member 31 can be sandwiched between the first flange 11 and the third flange 21, and the second seal member 32 can be sandwiched between the second flange 12 and the fourth flange 22, from which a self-sealing property can be obtained. In this way, the space can be decompressed reliably, and so high heat insulation performance can be obtained. The structure can be easily assembled simply by inserting the inner tube 20 into the outer tube 10.

In the heat-treating furnace 1, the outer tube 10 includes the bellows 13. With this configuration, when the outer tube 10 is shifted to a pressed position, the bellows 13 is elastically deformed and contracts. Thereby, the first seal member 31 and the second seal member 32 can be pressed against the third flange 21 and the fourth flange 22, respectively, of the inner tube 20 with a predetermined pressing force. As a result, even when the inner tube 20 is axially long or thermally expands more because the inner tube 20 is heated to a high temperature and the temperature rises significantly, no gap is generated between the seal member 31 and the first flange 11 or the third flange 21 or between the second seal member 32 and the second flange 12 or the fourth flange 22, so that sealing with the first seal member 31 and the second seal member 32 can be kept appropriately. Although the present embodiment describes the example of the outer tube 10 including the bellows 13, the inner tube 20 may include the bellows.

The heat-treating furnace 1 undergoes a predetermined preparation step (first preparation step) to have an operating state. In the first preparation step, as shown in FIG. 1A, for example, the outer tube 10 and the inner tube 20 are disposed at the cancellation position. In this state, the internal space of the inner tube 20 is heated by the heater until the temperature in the furnace reaches a target temperature, so that the inner tube 20 thermally expands as shown in FIG. 1B. The inner tube 20 increases in diameter due to the thermal expansion, and elongates axially. Then, the outer tube 10 is pressed and moved by the shifting means 40 relative to the thermally expanded inner tube 20, so that the tubes are disposed at the sandwiching position as shown in FIG. 1C. Then, the space between the outer tube 10 and the inner tube 20 is decompressed for heat insulation.

In such a first preparation step, the inner tube 20 is thermally expanded, followed by sandwiching the seal member 30 with the tubes. Thereby, distortion due to a difference in thermal expansion can be suppressed between the outer tube 10 and the inner tube 20. Therefore, a seal member with low elasticity and high heat resistance can be used, whereby thermal degradation of the seal member 30 can be suppressed, and the structure including such a seal member can be used in the system operating at high temperatures.

The heat-treating furnace 1 may undergo another preparation step (second preparation step) different from the first preparation step to have an operating state. The second preparation step includes adjustment of the shifting means 40, in which the degree of pressing of the seal member 30 is adjusted in accordance with a temperature rise of the inner tube 20. The shifting means 40 is adjusted by a control means not illustrated.

Figure 3:
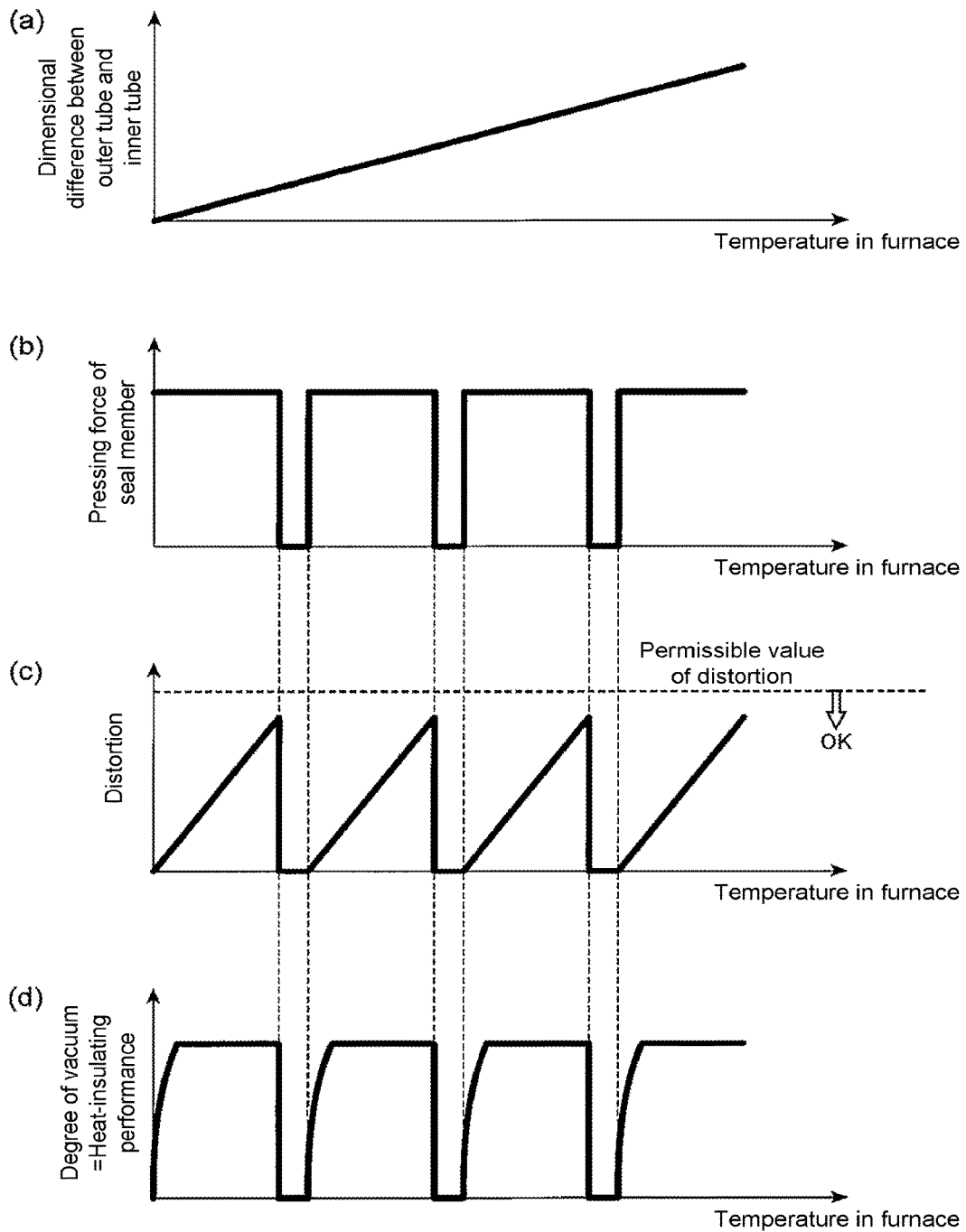
FIG. 3 is a graph showing the relationship between the temperature in the furnace and the dimensional difference between the outer tube and the inner tube, the pressing force of the seal member, the distortion, or the degree of vacuum.

The following describes the details of the second preparation step, with reference to FIG. 3.

FIG. 3 is a graph showing the relationship between the temperature change in the furnace during the second preparation step and the dimensional difference between the outer tube and the inner tube, the pressing force of the seal member, the distortion, or the degree of vacuum.

In the second preparation step, the shifting means 40 is controlled to dispose the outer tube 10 at the sandwiching position so as to press the first seal member 31 against the third flange 21 and press the second seal member 32 against the fourth flange 22. Then, heating of the internal space of the inner tube 20 starts to increase the temperature in the furnace and decompress the space between the outer tube 10 and the inner tube 20 (see FIG. 3(a) and FIG. 3(d)). As the temperature in the furnace increases, the dimensional difference between the outer tube 10 and the inner tube 20 increases, and so distortion between the outer tube 10 and the inner tube 20 also increases (see FIG. 3(c)).

Then, when the temperature in the furnace increases until the amount of temperature rise at the sandwiching position reaches a predetermined value, the control means determines that the distortion between the outer tube 10 and the inner tube 20 increases to some extent. Then to remove the distortion, the control means controls the shifting means 40 to temporarily release the pressure on the seal member 30, and soon starts to press the seal member again. Specifically, the control means controls the shifting means 40 to move the outer tube 10 from the sandwiching position to the cancellation position, and then return the outer tube to the sandwiching position. Such motion of the shifting means 40 temporarily changes the pressing force of the seal member 30 to 0, and the distortion stored due to the temperature rise at the sandwiching position can be removed (see FIG. 3(b) and FIG. 3(c)).

Then, the temperature in the furnace increases while setting the outer tube 10 at the sandwiching position. When the amount of temperature rise reaches a predetermined value after the returning to the sandwiching position, the control means controls to temporarily release the pressure on the seal member 30, and soon start to press the seal member again. Then, the motion of the shifting means 40 is repeated until the temperature in the furnace increases the target temperature.

In the second preparation step, the motion of the shifting means 40 is performed intermittently in accordance with a rise of the temperature in the furnace, and distortion can be removed for every motion. Therefore the heat-treating furnace 1 in the operating state has reduced distortion due to thermal expansion of the inner tube 20.

The second preparation step can prevent an increase of the distortion beyond the permissible value. Therefore, the seal member 30 with low elasticity and high heat resistance can be used.

In the second preparation step, the motion to remove distortion is performed intermittently in accordance with a temperature rise in the furnace, but as shown in FIG. 3(d), the degree of vacuum of the space between the outer tube 10 and the inner tube 20 rises soon after the outer tube 10 is disposed at the pressed position, following the motion to remove distortion, and so the desired heat-insulating performance can be achieved. Therefore during the course of the temperature in the furnace rising to the target temperature, the space can be in a decompressed state for most of the time other than a short time period when the outer tube moves from the pressed position to the cancellation position, and the benefit of decompression heat-insulation can be obtained.

Second Embodiment

The following describes a second embodiment of the present disclosure in details, with reference to the drawings.

Figure 2A:
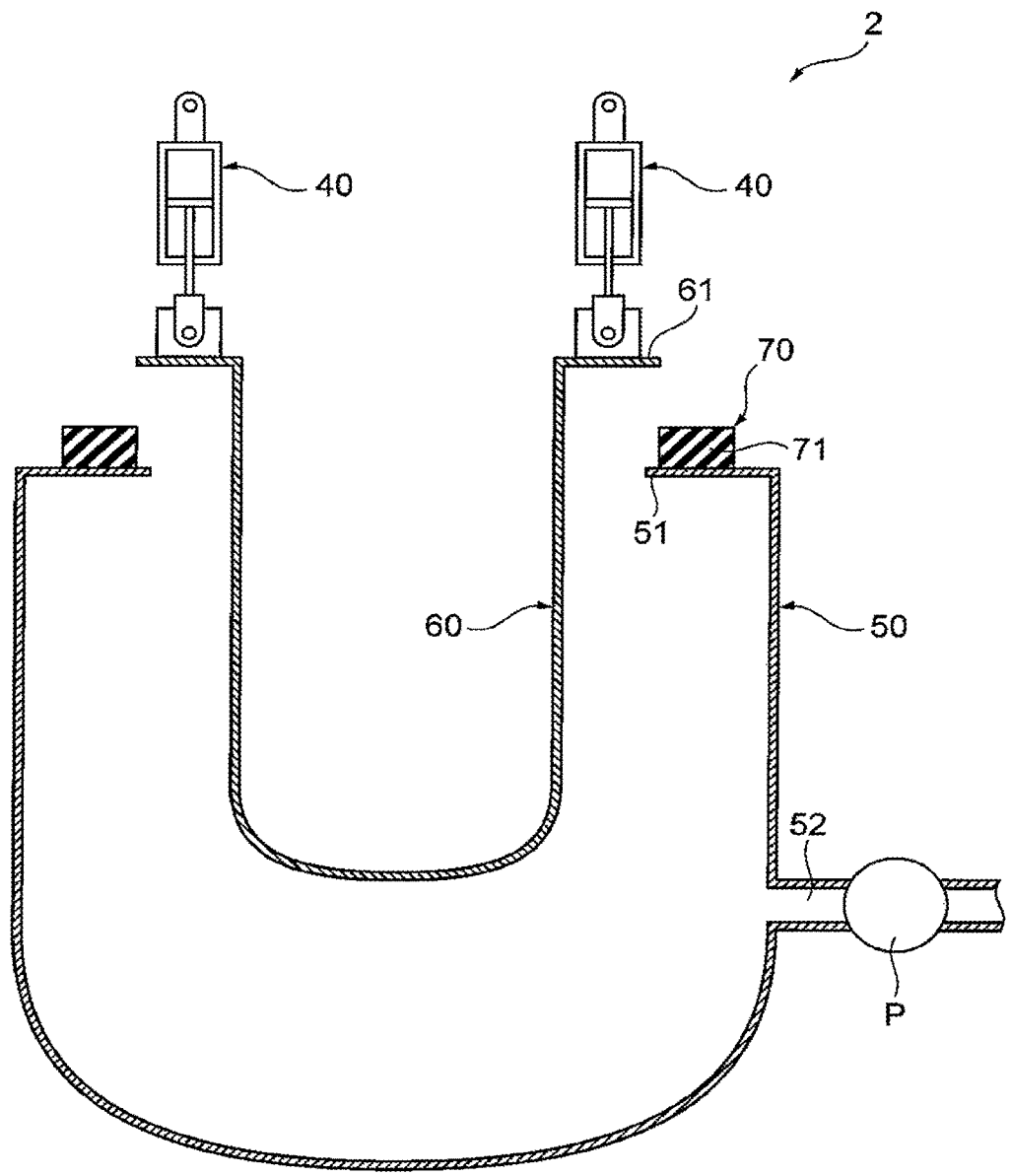
FIG. 2A schematically shows a heat-treating furnace in cross section, having a heat-insulating wall structure according to the second embodiment, and shows the inner tube before thermal expansion.
Figure 2B:
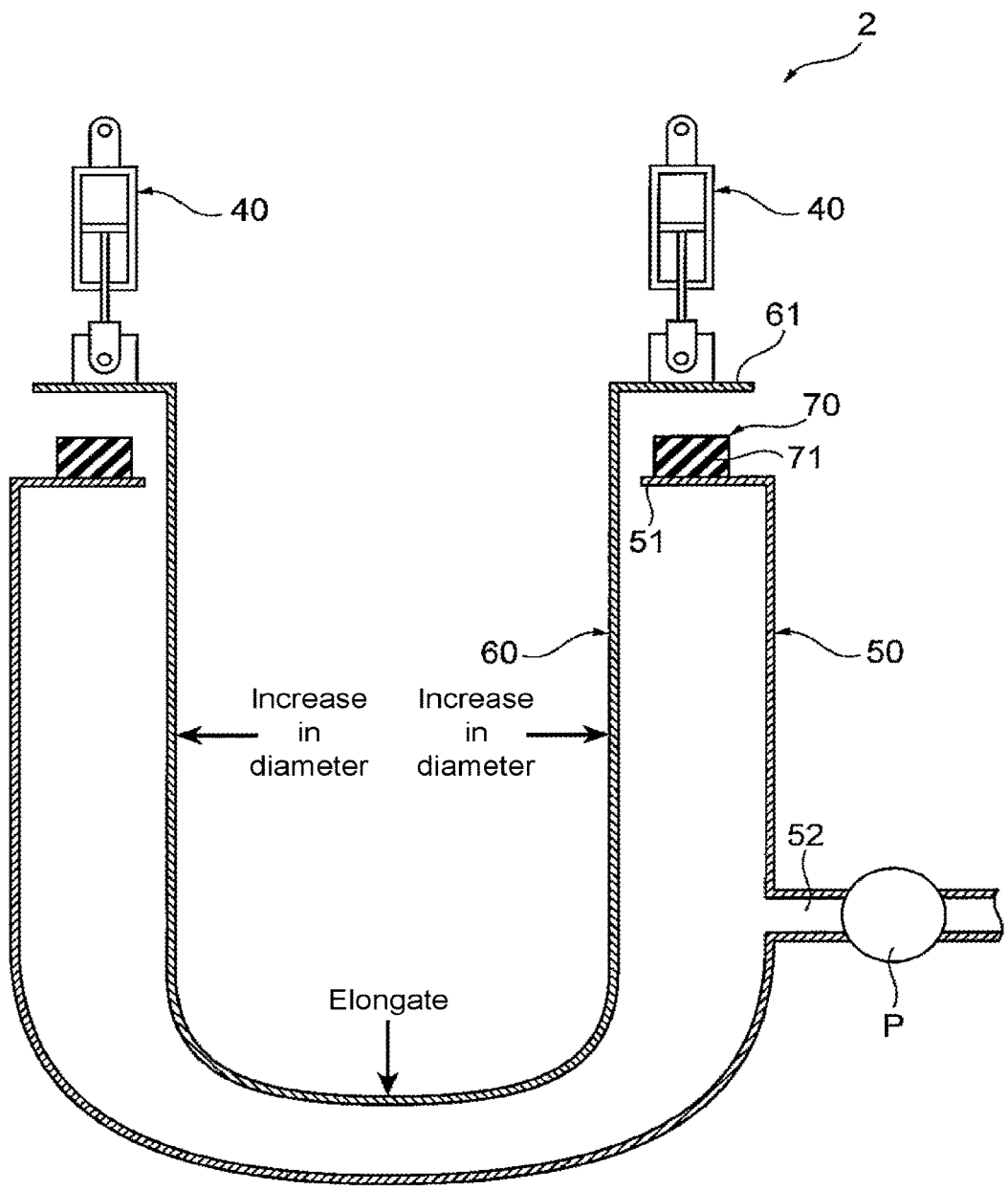
FIG. 2B schematically shows a heat-treating furnace in cross section, having a heat-insulating wall structure according to the second embodiment, and shows the inner tube that is thermally expanded.
Figure 2C:
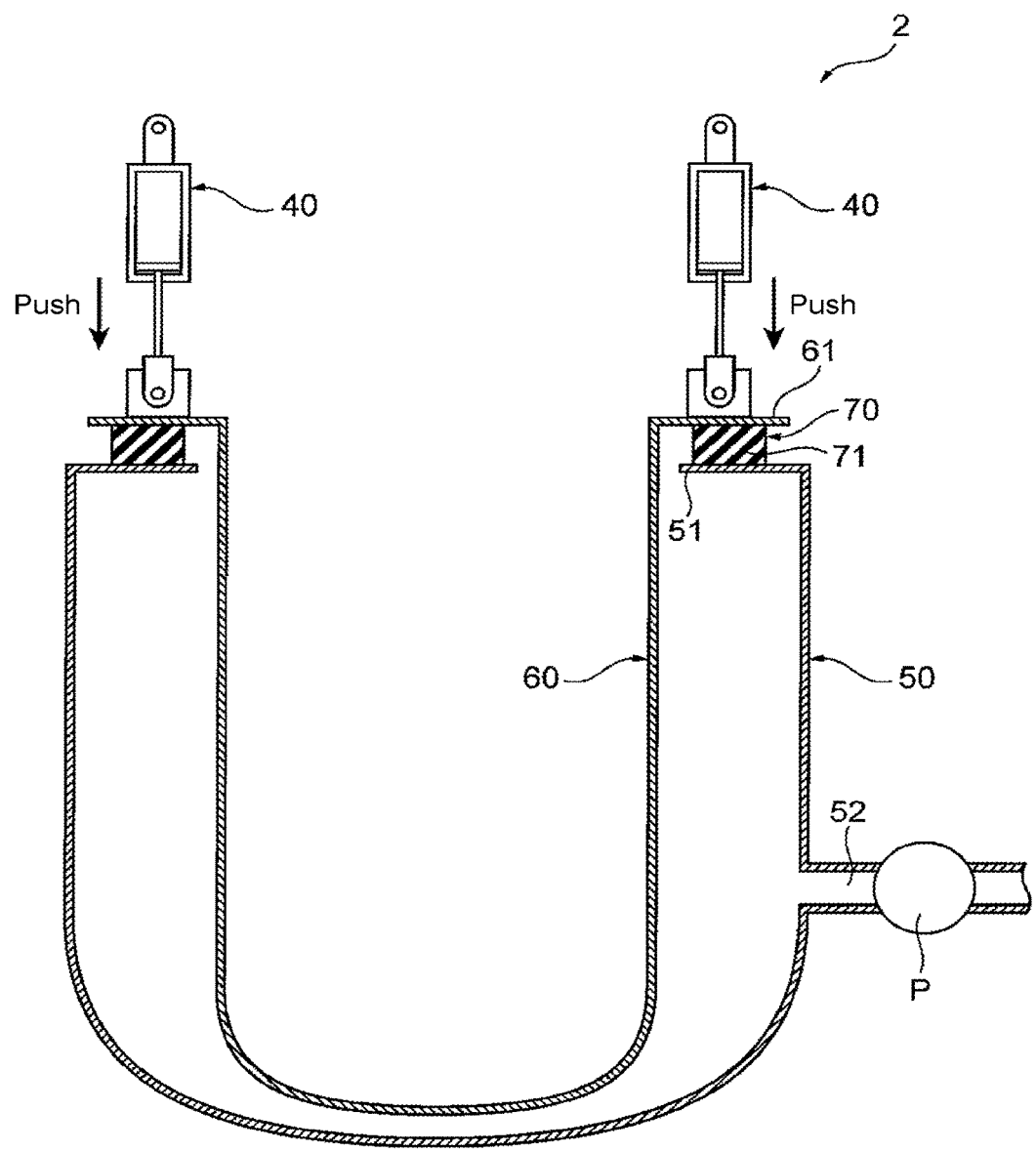
FIG. 2C schematically shows a heat-treating furnace in cross section, having a heat-insulating wall structure according to the second embodiment, and shows the decompressed space between the inner tube and the outer tube.

FIG. 2 schematically shows a heat-treating furnace in cross section, having a decompression heat-insulating pipe structure according to the second embodiment. FIG. 2A is a cross-sectional view showing the inner tube before thermal expansion, FIG. 2B is a cross-sectional view showing the inner tube that is thermally expanded, and FIG. 2C is a cross-sectional view of the decompressed space between the inner tube and the outer tube.

The heat-treating furnace 2 has a double-tube structure with a bottom, including an outer tube 50 and an inner tube 60 inserted into the outer tube from the opening end. The outer tube 50 is a tubular member made of metal, such as stainless steel. The outer tube 50 has one end that is a closed end, and the other end that is an open end. Similarly to the outer tube 50, the inner tube 60 is a tubular member made of metal, such as stainless steel. The inner tube 60 has one end that is a closed end, and the other end that is an open end.

The outer tube 50 and the inner tube 60 are disposed coaxially on a base not illustrated so that their axial directions are perpendicular to the base, and are supported so as to be relatively movable in the axial direction. The outer tube 50 of the present embodiment is supported to vertically reciprocate relative to the inner tube 60 in the axial direction.

The outer tube 50 and the inner tube 60 have flanges 51 and 61 opposed to each other. The flange 51 extends radially inward from the end of the outer tube 50, and the flange 61 extends radially outward from the end of the inner tube 60. A seal member 70 is disposed between the flange 51 and the flange 61. The seal member 70 is disposed at the outer tube 50 that expands less thermally.

The seal member 70 has an annular shape, and is sandwiched between the flange 51 and the flange 61 for sealing between the flange 51 and the flange 61. The seal member has a configuration to keep the space between the outer tube 50 and the inner tube 60 in a decompression state. The seal member 70 is made of a material with less elasticity and high heat resistance, such as graphite and vermiculite (heat resistant temperature: 1000° C.), for example. For the seal member 70, Thermiculite #815 produced by Flexitallic Ltd can be used, for example.

The inner tube 60 includes a shifting means 40. The shifting means shifts the outer tube 50 and the inner tube 60 relatively so as to selectively dispose these tubes at a sandwiching position to sandwich the seal member 70 between the flange 51 and the flange 61, and at a cancellation position to cancel the sandwiching. The shifting means 40 has an air cylinder that can elongate and contract due to the compressed air supplied. As the air cylinder elongates, the inner tube 60 moves from an axially one side to the other side, and is disposed at the sandwiching position (see FIG. 2C). As the air cylinder contracts, the inner tube 60 moves from the axially other side to the one side, and is disposed at the cancellation position (see FIG. 2B).

At the sandwiching position, the flange 61 of the inner tube 60 is pressed against the seal member 70 at the flange 51 of the outer tube 50, and so the seal member 70 is sandwiched from axially both sides between the flange 51 and the flange 61 for sealing between the flange 51 and the flange 61.

On the contrary, at the cancellation position, the seal member 70 at the flange 51 of the outer tube 50 is separated from the flange 61 of the inner tube 60 so as to define a predetermined gap with the flange 61 for cancellation of the sealing between the flange 51 and the flange 61.

The outer tube 50 connects with an exhaust channel 52 leading to a vacuum pump P. At the pressed position, air between the outer tube 50 and the inner tube 60 is exhausted through the exhaust channel 52 so that the space between the outer tube 50 and the inner tube 60 can be decompressed. Such decompressed space between the outer tube 50 and the inner tube 60 leads to heat insulation between the external part of the outer tube 50 and the internal space surrounded with the inner tube 60 of the heat-treating furnace 2.

In the heat-treating furnace 2, the temperature of the internal space of the inner tube 60 (the temperature in the furnace) is kept at high temperatures, and the space between the outer tube 50 and the inner tube 60 is decompressed for heat insulation. In such an operating state, a work is conveyed into the internal space of the inner tube 60 and can be heated, and so the heat-treating furnace is a batch-type furnace. A not-illustrated heating oven is connected to the internal space of the inner tube 60 so as to increase the temperature in the furnace and keep the space at a high temperature.

The heat-treating furnace 2 undergoes a predetermined preparation step (first preparation step) to have an operating state. In the first preparation step, as shown in FIG. 2A, for example, the outer tube 50 and the inner tube 60 are disposed at the cancellation position. In this state, the internal space of the inner tube 60 is heated until the temperature in the furnace reaches a target temperature, so that the inner tube 60 thermally expands as shown in FIG. 2B. The inner tube 60 increases in diameter due to the thermal expansion, and elongates axially. Then, the thermally expanded inner tube 60 is pressed and moved by the shifting means 40, so that the inner tube is disposed at the sandwiching position as shown in FIG. 2C. Then, the space between the outer tube 50 and the inner tube 60 is decompressed for heat insulation.

In such a first preparation step, the inner tube 60 is thermally expanded, followed by sandwiching of the seal member 70 with the tubes. Thereby, distortion due to thermal expansion can be suppressed between the outer tube 50 and the inner tube 60. Therefore, the seal member with low elasticity and high heat resistance can be used, whereby thermal degradation of the seal member 70 can be suppressed, and the structure including such a seal member can be used in the system operating at high temperatures.

The heat-treating furnace 2 may undergo another preparation step (second preparation step) different from the first preparation step to have an operating state. The second preparation step includes adjustment of the shifting means 40, in which the degree of pressing of the seal member 70 is adjusted in accordance with a temperature rise of the inner tube 60. The shifting means 40 is adjusted by a control means not illustrated.

In the second preparation step, the inner tube 60 is disposed at the sandwiching position so as to press the flange 61 against the seal member 70. Then, while increasing the temperature in the furnace, the space between the outer tube 50 and the inner tube 60 is decompressed. As the temperature in the furnace increases, the dimensional difference between the outer tube 50 and the inner tube 60 increases, and so distortion between the outer tube 50 and the inner tube 60 also increases.

Then, when the temperature in the furnace increases until the amount of temperature rise at the sandwiching position reaches a predetermined value, the control means determines that the distortion between the outer tube 50 and the inner tube 60 increases to some extent. Then to remove the distortion, the control means controls the shifting means 40 to temporarily release the pressure on the seal member 70, and soon starts to press the seal member again. Specifically, the control means controls the shifting means 40 to move the inner tube 60 from the sandwiching position to the cancellation position, and then return the inner tube to the sandwiching position again. Such motion of the shifting means 40 temporarily changes the pressing force of the seal member 70 to 0, and the distortion stored due to the temperature rise at the sandwiching position can be removed.

Then, the temperature in the furnace increases while setting the inner tube 60 at the sandwiching position. When the amount of temperature rise reaches a predetermined value after the returning to the sandwiching position, the control means controls to temporarily release the pressure on the seal member 70, and soon start to press the seal member again. Then, the motion of the shifting means 40 is repeated until the temperature in the furnace increases the target temperature.

In the second preparation step, the motion of the shifting means 40 is performed intermittently in accordance with a rise of the temperature in the furnace, and distortion can be removed for every motion. Therefore the heat-treating furnace 2 in the operating state has reduced distortion due to thermal expansion of the inner tube 60.

The second preparation step can prevent an increase of the distortion beyond the permissible value. Therefore, the seal member 70 with low elasticity and high heat resistance can be used.

In the second preparation step, the motion to remove distortion is performed intermittently in accordance with a temperature rise in the furnace, but the degree of vacuum of the space between the outer tube 50 and the inner tube 60 rises soon when the outer tube 50 is disposed at the pressed position after the motion to remove distortion, and so the desired heat-insulating performance can be achieved. Therefore during the course of the temperature in the furnace rising to the target temperature, the space can be in a decompressed state for most of the time other than a short time period when the tube moves from the pressed position to the cancellation position, and the benefit of decompression heat-insulation can be obtained.

That is a detailed description of the embodiments of the present disclosure. The present disclosure not limited to the above-stated embodiments, and the design may be modified variously without departing from the spirits of the present disclosure defined in the attached claims.

DESCRIPTION OF SYMBOLS 1, 2 Heat-treating furnace
10, 50 Outer tube
11 First flange
12 Second flange
13 Bellows
20, 60 Inner tube
21 Third flange
22 Fourth flange
30, 70 Seal member
31 First seal member
32 Second seal member
40 Shifting means

What is claimed is:
1. A decompression heat-insulating pipe structure comprising an outer tube and an inner tube each having a flange; and a seal member between the flanges, the seal member being configured to keep a space between the outer tube and the inner tube in a decompression state, further comprising:
a shifting means configured to shift the outer tube and the inner tube relatively so as to selectively dispose the tubes at a sandwiching position to sandwich the seal member between the flanges and at a cancellation position to cancel sandwiching of the seal member.

2. The decompression heat-insulating pipe structure according to claim 1, further comprising a control means configured to control the shift means, wherein
the control means controls the shifting means to, when an amount of temperature rise of the inner tube at the sandwiching position reaches a predetermined value, move the outer tube or the inner tube to dispose the outer tube or the inner tube from the sandwiching position to the cancellation position and then dispose the outer tube or the inner tube from the cancellation position to the sandwiching position again.

3. The decompression heat-insulating pipe structure according to claim 2, wherein
the outer tube has a first flange extending radially inward from an axially one end thereof, and a second flange extending radially outward from the axially other end thereof, the inner tube has a third flange extending radially inward from an axially one end thereof, and a fourth flange extending radially outward from the axially other end thereof, the third flange being opposed to the first flange at an axially inward position of the first flange, and the fourth flange being opposed to the second flange at an axially outward position of the second flange, and the seal member includes a first seal member between the first flange and the third flange, and a second seal member between the second flange and the fourth flange.

4. The decompression heat-insulating pipe structure according to claim 3, wherein at least one of the outer tube and the inner tube includes a bellows that can elongate or contract axially due to elastic deformation.

* * * * *